United States Patent [19]
Rabinovich

[11] Patent Number: 6,151,916
[45] Date of Patent: Nov. 28, 2000

[54] METHODS OF MAKING GLASS FERRULE OPTICAL FIBER CONNECTORS

[75] Inventor: Eliezer M. Rabinovich, Berkeley Heights, N.J.

[73] Assignee: Lucent Technologies Inc., Murray Hill, N.J.

[21] Appl. No.: 09/089,155

[22] Filed: Jun. 2, 1998

[51] Int. Cl.[7] .................................................. C03C 21/00
[52] U.S. Cl. ........................ 65/30.13; 65/30.14; 65/108
[58] Field of Search ................................ 65/30.13, 30.14, 65/108

[56] References Cited

U.S. PATENT DOCUMENTS

| | | | |
|---|---|---|---|
| 3,947,225 | 3/1976 | Audesse et al. | 431/95 |
| 3,959,000 | 5/1976 | Nakagawa et al. | 428/410 |
| 4,017,291 | 4/1977 | Gliemeroth et al. | 65/30.14 |
| 4,053,679 | 10/1977 | Rinehart | 428/410 |
| 4,812,009 | 3/1989 | Carlisle et al. | 385/62 |
| 4,850,670 | 7/1989 | Mathis et al. | 385/68 |
| 4,872,896 | 10/1989 | LaCourse et al. | 65/30.14 |
| 5,295,213 | 3/1994 | Ueda et al. | 385/78 |
| 5,396,572 | 3/1995 | Bradley et al. | 385/78 |
| 5,598,496 | 1/1997 | Anderson et al. | 385/84 |

FOREIGN PATENT DOCUMENTS

| | | |
|---|---|---|
| 909967 | 4/1999 | European Pat. Off. . |
| 98/45739 | 10/1998 | WIPO . |

*Primary Examiner*—Sean Vincent
*Attorney, Agent, or Firm*—Thomas, Kayden, Horstemeyer & Risley LLP

[57] ABSTRACT

The specification describes processes for the manufacture of glass ferrules for optical fiber connectors wherein the glass ferrules have a composition comprising silicon oxide, alkali metal oxide, and aluminum oxide to which is added 1–35% of lead oxide.

5 Claims, 1 Drawing Sheet

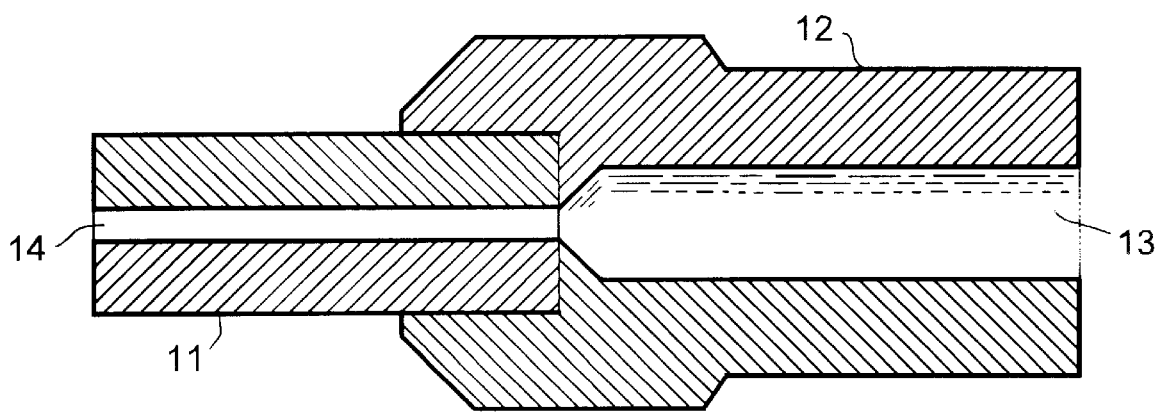

METHODS OF MAKING GLASS FERRULE OPTICAL FIBER CONNECTORS

FIELD OF THE INVENTION

This invention relates to glass ferrules for connecting optical fibers, and to methods for their manufacture.

BACKGROUND OF THE INVENTION

Optical fiber connectors that comprise a glass ferrule are known. See U.S. Pat. No. 4,850,670. However, despite potential cost advantage over conventionally used ceramic ferrules, glass ferrules have found only limited use, e.g., in the so-called rotary splice. This general failure to adopt an otherwise advantageous technology is due at least in part by the failure of many prior art glass ferrules to meet stringent mechanical requirements, including strength and dimensional standards. Indeed, in the rotary splice there is only minimal mechanical stress on the glass ferrule since the rotary splice is designed for one time assembly.

Glass ferrules are produced typically from a tubular preform by drawing the preform into a continuous glass tube, and cutting the tube into sections each of which becomes a glass ferrule. Since the early recognition of the potential economies of substituting glass ferrules for ceramic ferrules, one concern about reliability of glass ferrule manufacture has been the dimensional control capabilities of glass making technology as compared with the known dimensional precision inherent in ceramic technology. In practice, it has been found that relatively good dimensional control can be realized with glass ferrule fabrication techniques. This is due to inherent behavior of glass during tube drawing in which the geometry of the preform is replicated to a high degree in the drawn tube, and the success of glass ferrule technology so far has relied on that inherent property. However, another concern with glass ferrules is strength. Considerable efforts have been made to improve the strength of glass materials for ferrule manufacture.

In view of the significant cost savings that can be realized from the replacement of ceramic ferrule optical fiber connectors with relatively inexpensive glass ferrule optical fiber connectors, it would be highly desirable to have available glass ferrules with improved strength that can meet the design standards for current connectors, and also have the dimensional control necessary to meet those standards.

A technique for producing high strength glass ferrules for optical fiber connectors is described and claimed in U.S. Pat. No. 5,598,496. This technique involves etching the outer surface of the glass ferrule to improve the strength of the glass, and coating the etched surface with an adherent coating of, e.g. Ni and Au.

U.S. Pat. No. 5,295,213 discloses a method of strengthening alkali-containing glass ferrules by ion exchange. The ion exchange method applies to borosilicate glass containing substantial amounts of $Na_2O$, and results in a thin layer of strengthened glass on the outer surface of the glass where the ion exchange process occurs. However, this layer is thin, and is often abraded away in practical service after which the ferrule returns to its original weak state. Moreover, this technique is not applicable to vitreous silica or PYREX™ ferrules.

It is known that glasses with a higher amount of sodium and with a significant amount of alumina are more effective when treated by an ion-exchange process, and we have used such glass compositions, e.g. those described in U.S. Pat. No. 3,661,545, to make ferrules that can survive very harsh abrasion treatment and thermal shock with only moderate loss of the enhanced strength.

Although the glass materials described in U.S. Pat. No. 3,661,545 are highly desirable in terms of strength and overall utility, they are difficult to process. They melt at very high temperatures, i.e. 1500–1550° C., which are inconvenient from a manufacturing standpoint. Moreover, even when melted at this temperature, they retain many small bubbles and typically have unmelted stones and cords (compositional non-uniformities). When ferrules are drawn from a preform with these characteristics, the defects in the glass cause irregularities in the drawing process, confuse control equipment, and drastically reduce the yield of ferrules within required dimensional tolerances. Moreover, the high melting characteristics of these glass lead to high extrusion temperatures, i.e. nearly 1000° C., in preparing the ferrule preforms. This unusually high extrusion temperature rapidly deteriorates extrusions dies, thus resulting in higher costs of manufacture.

A process for improving the manufacturability of high strength glass ferrules would be a significant advance in this technology.

STATEMENT OF THE INVENTION

I have developed a new glass material that can be strengthened using conventional ion exchange processes, and melts at temperatures that are convenient for economical manufacture. This glass material is a sodium aluminum silicate glass modified with lead oxide.

BRIEF DESCRIPTION OF THE DRAWING

The FIGURE shows a typical optical fiber connector employing a glass ferrule component.

DETAILED DESCRIPTION

A typical optical fiber connector with a glass ferrule connector component is shown in FIG. 1. The connector comprises glass ferrule 11 with a center bore 14 for the optical fiber (not shown). It should be understood that the drawing is not to scale. For example, the bore in the glass ferrule is exaggerated for clarity. The ferrule is adapted for insertion into a terminal member 12 which has a center bore 13 for the mating fiber. To accommodate a coated fiber the bore 13 in the terminal member 12 is typically larger than the bore 14 in ferrule 11. Examples of these types of connectors are described in U.S. Pat. Nos. 4,850,670; 5,396,572; 5,295,213 and 4,812,009, all of which are incorporated herein by reference.

As mentioned above, glass ferrule components such as 11 in FIG. 1, can be manufactured from a hollow bore preform by drawing the preform into a tube, as described in U.S. Pat. No. 5,295,213, and cutting sections of the drawn tube to form glass ferrules. As is well known the preform has substantially larger dimensions than the drawn tube and these dimensions determine the geometry and the dimensional precision of the drawn ferrules. Due to the requirement of a hollow bore, preforms for glass ferrules are typically formed by extrusion using well known glass extrusion techniques, although machining and drilling from cast ingots are alternative choices.

Glass materials for ferrule manufacture are preferably subjected to an ion exchange process to strengthen the outer shell of the glass ferrule. After forming the glass ferrule body, i.e. after drawing from the preform and preferably after cutting the individual ferrule lengths, the ferrules are treated in a molten salt bath of, for example, potassium nitrate to exchange potassium ions for sodium ions in the glass ferrule body. This effect takes place in a surface layer of the glass body by diffusion of alkali ions both into and from the glass body. This interdiffusion results in an increase of large potassium ions in the surface layer which causes the surface of the glass body to be stressed in compression which as known in the art imparts improved mechanical strength to the glass body. The depth of the potassium rich layer depends in part on the duration of the ion exchange process. While very high strength has been demonstrated even for thin (5–10 $\mu$m) layers, slight abrasion or polishing may remove this layer and eliminate the strengthening effect. Accordingly thicker layers, >20 $\mu$m, are preferred.

The glass material forming the ferrule structure according to the invention is a sodium aluminum silicate glass to which substantial amounts of lead oxide are added. The addition of lead oxide in amounts of 1–35% is found to improve the manufacturability of glass ferrules without impairing their mechanical strength. Examples of these glass materials were prepared and processed as in commercial ferrule manufacture. The examples are presented in the following Table I. The amounts are in weight %.

TABLE I

| Components | Example 1 | Example 2 | Example 3 |
| --- | --- | --- | --- |
| $SiO_2$ | 55.3 | 50.3 | 51.35 |
| $Na_2O$ | 11.4 | 10.4 | 10.6 |
| $K_2O$ | 3.25 | 2.95 | 3.05 |
| MgO | 3.25 | 2.95 | — |
| CaO | 0.2 | 0.2 | — |
| $Al_2O_3$ | 15.15 | 13.8 | 14.0 |
| PbO | 9.9 | 18.0 | 20.1 |
| $TiO_2$ | 0.65 | 0.6 | — |
| $As_2O_3$ | 0.9 | 0.8 | 0.9 |

The softening points, anneal points, and strain points for these glasses were measured and the results are given in Table II.

TABLE II

| Properties | Example 1 | Example 2 | Example 3 |
| --- | --- | --- | --- |
| Softening pt, ° C. | 824 | 775 | 788 |
| Annealing pt., ° C. | 580 | 563 | 546 |
| Strain pt., ° C. | 530 | 519 | 498 |

Measurements of flexural strength were performed on ferrules after an ion exchange process. Ion exchange processes are well known in the art, and typical conditions are heating to a temperature of at least 350° C. and a treatment period of at least 15 minutes. The same ferrules were then subjected to a severe attrition process in a hard SiC powder. This attrition process causes microcracks on the glass surface and usually substantially degrades the strength of the glass. The original glass, without the ion exchange strengthening process, shows strength degradation from about 40 Kpsi to about 18 Kpsi after a 20 min. attrition process. For comparison, flexural strength measurements of the ion exchanged glasses were taken after a 20 minute and a 2 hour exposure to this treatment. The results are given in Table III below. The conditions of the ion exchange process are indicated in the Table.

TABLE III

| Properties | Example 1 | Example 2 | Example 3 |
| --- | --- | --- | --- |
| Ion Exch. @ ° C./hr | 450/1 | 425/16 | 425/16 |
| Flex. strength psi no attrition | 209k ± 12k | 191k ± 23k | 191k ± 30k |
| Same after 20 min. attrition in SiC | 168k ± 33k | 158k ± 8k | 164k ± 19k |
| Same after 2 hr. attrition in SiC | | | 171k ± 31k |

As seen from Table III, all ion-exchanged specimens exhibit some degradation of strength after attrition (15–20%). Still the residual strength remains very high.

The processing temperatures implicit from the measurements in Table II compare favorably with the high strength glass compositions described in U.S. Pat. No. 3,661,545. Compared with the properties of those materials the glasses of this invention have a softening point and annealing point of the order of 50–100° C. lower while retaining at least as good mechanical (i.e. strength) properties.

Based on the foregoing examples the relative amounts of silicon oxide, alkali metal oxide, lead oxide and aluminum oxide than can be predicted with reasonable confidence to yield high strength glass ferrules with low processing temperatures are:

alkali metal oxide (as $A_2O$): 9–17 wt %—preferably 11–15 wt % aluminum oxide (as $Al_2O_3$) 9–18 wt %—preferably 11–16 wt % lead oxide (as PbO) 1–35 wt %—preferably 7–30 wt % silicon oxide (as $SiO_2$): preferably 45–65 wt %

The alkali metal A (in $A_2O$) can be selected from the group consisting of Na, Li and K but the $A_2O$ ingredient should contain at least 9% $Na_2O$, and preferably is a mixture of $Na_2O$ and $K_2O$. Other oxides, such as CaO, MgO, $TiO_2$ may be found useful in small amounts. They typically will comprise less than 5% of the overall composition. $As_2O_3$ and $Sb_2O_3$ are frequently included in an amount of approximately 1% to reduce bubble formation Various additional modifications of this invention will occur to those skilled in the art. All deviations from the specific teachings of this specification that basically rely on the principles and their equivalents through which the art has been advanced are properly considered within the scope of the invention as described and claimed.

What is claimed is:

1. A method for the manufacture of glass ferrules comprising the steps of
   a. drawing a glass tube from a glass preform, said preform having a hollow cylindrical bore extending essentially throughout the length of the preform, said cylindrical bore and said cylindrical glass preform being essentially concentric,
   b. cutting the drawn tube into sections to form individual glass ferrule bodies,
   c. subjecting said glass ferrule bodies to an ion exchange process by treating them in a molten alkali metal bath, the improvement characterized in that the glass ferrule bodies have a composition comprising silicon oxide, alkali metal oxide, lead oxide and aluminum oxide in the following weight %:

alkali metal oxide (as $A_2O$): 9–17 wt %
   aluminum oxide (as $Al_2O_3$) 9–18 wt %
   lead oxide (as PbO) 1–35 wt % silicon oxide (as $SiO_2$): remainder where A is selected from the group consisting of Li, Na and K and $A_2O$ comprises at least 9 wt % of $Na_2O$.

2. The method of claim 1 wherein the ion exchange process comprises treating the glass ferrule bodies for at least 15 minutes at a temperature of at least 350° C.

3. The method of claim 1 wherein the composition of the glass ferrule bodies includes additional additives up to a total of 5 wt % of the total composition.

4. A method for the manufacture of glass ferrules comprising the steps of a. drawing a glass tube from a glass preform, said preform having a hollow cylindrical bore extending essentially throughout the length of the preform, said cylindrical bore and said cylindrical glass preform being essentially concentric, b. cutting the drawn tube into sections to form a plurality of glass ferrule bodies, c. subjecting said glass ferrule bodies to an ion exchange process by treating them in a molten alkali metal bath, the improvement characterized in that the glass ferrule bodies have a composition comprising silicon oxide, alkali metal oxide, lead oxide and aluminum oxide in the following relative weight %:

alkali metal oxide (as $A_2O$): 11–15 wt % aluminum oxide (as $Al_2O_3$) 11–16 wt % lead oxide (as PbO) 7–30 wt % silicon oxide (as $SiO_2$): 45–65 wt % where A is selected from the group consisting of Li, Na and K and $A_2O$ comprises at least 9 wt % of $Na_2O$.

5. The method of claim 4 wherein the composition of the glass ferrule bodies includes additional additives up to a total of 5 wt % of the total composition.

\* \* \* \* \*